INVENTOR
Eugene F. Grant.
BY C. L. Freedman
ATTORNEY

INVENTOR
Eugene F. Grant.
BY C. L. Freedman
ATTORNEY

Patented Aug. 17, 1954

2,686,875

UNITED STATES PATENT OFFICE 2,686,875

FREQUENCY CONTROL SYSTEM

Eugene F. Grant, Swissvale, Pa., assignor to Westinghouse Electric Corporation, East Pittsburgh, Pa., a corporation of Pennsylvania Application July 20, 1945, Serial No. 606,204

6 Claims. (Cl. 250—36)

This invention relates to frequency control systems and it has particular relation to systems for maintaining substantially constant the output frequency of electrical oscillation generators.

In accordance with the invention, a system is provided wherein the frequency of the output of an oscillation generator is forced to oscillate within a small range about a predetermined frequency. This predetermined frequency may be substantially constant and may be determined by the resonant frequency of a tuned circuit, such as a cavity resonator. Such a system not only has a rapid response but is of relatively simple construction. Furthermore, the rate of oscillation of the frequency of the oscillation generator about the predetermined frequency may be made substantially greater than any hunting frequency, which may be present in the system. Under such circumstances, special precautions for eliminating hunting are unnecessary. In addition, the system permits the utilization of a tuned or resonant circuit, such as a cavity resonator, having a relatively low Q.

A system designed in accordance with the invention may be employed generally as a source of constant frequency. As a more specific example, a system embodying the invention may be employed as a local oscillator in a superheterodyne receiver for receiving brief, intermittent code signals from distant radio transmitters. Since the deviation in the frequency of an oscillation generator controlled in accordance with the invention from a predetermined constant frequency may be maintained readily within one part in 100,000, the system when employed as a local oscillator in a superheterodyne receiver permits the utilization of a relatively narrow pass band for the intermediate frequency stages of the receiver.

According to a further aspect of the invention, the local oscillator of a superheterodyne receiver is modulated in frequency. Such modulation desirably modifies the effective pass characteristics of the intermediate frequency stages of the superheterodyne receiver.

It is, therefore, an object of the invention to provide an improved frequency control system.

It is a further object of the invention to provide an improved system for controlling an oscillation generator wherein the frequency output of the generator is periodically varied within a small range about a predetermined constant frequency.

It is an additional object of the invention to provide an improved system for controlling an oscillation generator wherein the frequency output of the generator is continuously oscillated within a small range about the resonant frequency of a tuned circuit.

It is another object of the invention to provide an improved frequency control system having means for normally maintaining the frequency output of an oscillation generator within a predetermined small range and having normally ineffective means which is effective on deviation of the output of the oscillation generator from the aforesaid range of restoring the frequency of the oscillation generator to such range.

It is a further object of the invention to modify the effective pass band of the intermediate frequency stages of superheterodyne receivers.

It is also an object of the invention to frequency modulate the output of the local oscillator of a superheterodyne receiver.

Other objects of the invention will be apparent from the following description taken in conjunction with the accompanying drawing, in which.

Figure 1:
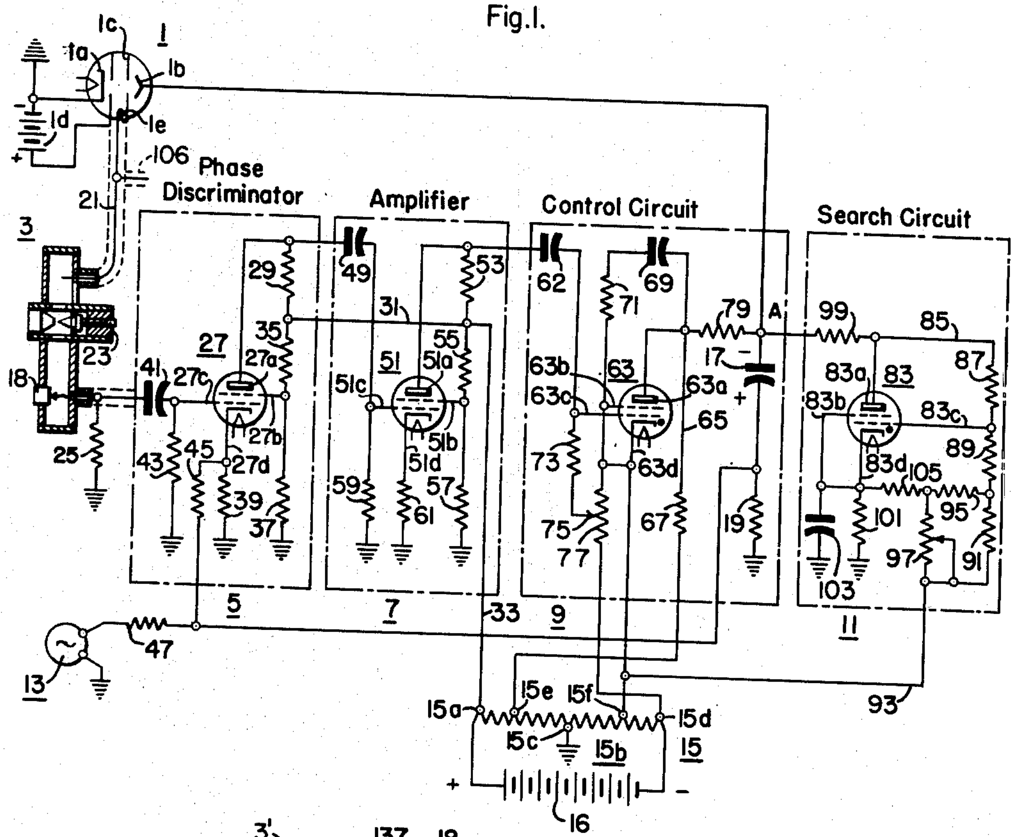
Figure 1 is a schematic view with parts in cross section of a frequency control system embodying the invention.

Referring to the drawings, Figure 1 shows a system which includes an oscillation generator 1, a tuned circuit 3, a phase discriminator 5, an amplifier 7, a control circuit 9, a search circuit 11, an alternating current generator 13, and a power supply source 15. In order to facilitate an understanding of the invention, the operation of the system will be briefly described. This will be followed by a more detailed discussion of the components of the system.

The oscillation generator 1 may be of any type having a frequency-control element and which is directly responsive to modulated signals applied thereto. For the purpose of discussion, it will be assumed that the oscillation generator 1 is a velocity-modulated tube of the type commonly referred to as a reflex Klystron. This tube has a grounded cathode electrode 1a and a reflector electrode 1b. As well understood in the art, the frequency output of the oscillation generator 1 is a function of the voltage applied between the electrodes 1a and 1b.

The voltage applied between the electrodes 1a and 1b in the oscillation generator is the resultant voltage across a capacitor 17 and a resistor 19. The voltage across the capacitor 17 determines the average direct voltage applied between the electrodes 1a and 1b. The resistor 19 is connected across the terminals of the generator 13 for the purpose of developing thereacross a small alternating voltage. This alternating voltage serves to frequency modulate the output of the oscillation generator 1.

Let it be assumed that the capacitor 17 has applied thereto a substantial charge of such polarity as to make the terminal A negative with respect to ground and that this charge is slowly dissipated through resistors connected across the plates of the capacitor. The voltage between the terminal A and ground is such as to produce a frequency output of the oscillation generator 1 which is above the resonant frequency of the tuned circuit 3, which is illustrated as a transmission-type cavity resonator. As the charge on the capacitor 17 is dissipated, the frequency output of the oscillation generator 1 decreases until it reaches the resonant frequency of the cavity resonator 3. A portion of the output of the oscillation generator 1 is supplied to the input of the cavity resonator 3 and the output of the cavity resonator is rectified in any suitable manner as by a crystal rectifier or detector 18. As the frequency of the output of the oscillation generator 1 passes through the resonant frequency of the cavity resonator, the output of the crystal rectifier 18 reverses in phase.

It will be recalled that a frequency modulation is applied to the oscillation generator by the alternating voltage drop across the resistor 19, which is connected across the alternating-current generator 13. This frequency modulation appears at the output of the crystal rectifier 18 as an alternating voltage which is of either two opposed phases depending on which side of the resonant frequency of the cavity resonator 3 the oscillation generator 1 is operating.

The phase discriminator 5 is responsive to the phase of the output of the crystal rectifier 18. The output of the phase discriminator, if of sufficient amplitude, may be applied directly to the control circuit. However, in the specific system illustrated in Fig. 1, the amplifier 7 is employed for inverting and amplifying the output of the phase discriminator 5 to a value suitable for operating the control circuit.

The purpose of the control circuit 9 is to lower the voltage of the terminal A to a substantially lower value when the frequency of the oscillation generator 1 passes through the resonant frequency of the cavity resonator 3. It will be recalled that as the capacitor 17 discharges, the voltage of the terminal A becomes less negative with respect to the ground and consequently the frequency of the oscillation generator 1 decreases. When the frequency of the oscillation generator 1 passes through the resonant frequency of the cavity resonator 3, the output of the crystal rectifier 18 reverses in phase and the resulting output of the phase discriminator 5 when inverted and amplified by the amplifier 7 becomes sufficient to actuate the control circuit 9. In response to such actuation, the control circuit restores the charge on the capacitor 17 and consequently increases the frequency of the oscillation generator 1 to a value above the resonant frequency of the cavity resonator 3.

After the control circuit has operated, the capacitor 17 again starts to discharge and the entire cycle is repeated. The frequency of repetition of the cycle of discharge and charge may have any desired value. In practice, a frequency of repetition of 200 times per second has been found suitable. The circuit is readily capable of maintaining the voltage across the capacitor 17 within plus or minus 0.05 volt of a predetermined value.

As previously pointed out, a charge is placed in the capacitor 17 having a polarity selected to make the terminal A negative with respect to ground. This charge may be applied to the capacitor 17 in any desired manner as by a manual charging operation. However, in the specific embodiment of Fig. 1, the search circuit 11 is provided for properly charging the capacitor 17 whenever the capacitor requires charging as, for example, when the system of Fig. 1 is initially placed in operation.

Turning now to a more detailed description of the system illustrated in Fig. 1, the oscillation generator 1, in addition to its cathode electrode 1a and its reflector electrode 1b, includes a cavity resonator 1c which is maintained at a positive voltage relative to the cathode in any suitable manner, as by means of a battery 1d. The output of the cavity resonator 1c is obtained from a conventional output loop 1e which is coupled to the input of the cavity resonator 3 by means of a coaxial cable 21.

The cavity resonator 3 is of the transmission type and may include an adjustment unit 23. By manipulation of the adjustment unit, the resonant frequency of the cavity may be adjusted. The output of the cavity resonator 3 is rectified by means of the crystal rectifier or detector 18 and applied across a resistor 25. The crystal rectifier 18 may be of any desired construction such as the silicon detector commonly employed in the art. Velocity-modulated tubes such as the oscillation generator 1, cavity resonators similar to the cavity resonator 3, and silicon detectors suitable for the rectifier 18 are well known in the art as shown, for example, by reference to Ultrahigh Frequency Techniques by J. G. Brainerd et al., 1942, published by D. Van Nostrand Company, Inc., New York city, and Klystron Technical Manual, 1944, published by the Sperry Gyroscope Company, Inc., Brooklyn, N. Y.

Since it is important that the cavity resonator 3 accurately maintain a predetermined resonant frequency, the cavity resonator should be designed to operate with great stability. If desired, for example, the cavity resonator 3 may be located in a container which is maintained at a constant temperature and constant pressure.

Figure 2:
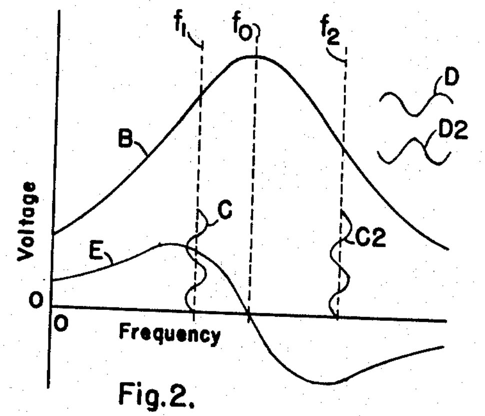
Fig. 2 is a graphical representation illustrating the characteristics of tuned circuits.

Since the operation of the system is dependent to a considerable extent on the characteristics of a tuned circuit, such as a cavity resonator, a brief discussion of such characteristics is given at this time. If a constant voltage input is supplied to the cavity resonator 3, and the frequency of the input is varied through the resonant frequency of the cavity resonator, a curve similar to the curve B of Fig. 2 is obtained. For this curve abscissae represents frequency and ordinates represent voltage output from the crystal rectifier 18.

It will be observed that the greatest response is obtained for an input having a frequency equal to the resonant frequency $f_0$ of the cavity resonator. For frequencies on either side of the resonant frequency, the output of the crystal rectifier 18 decreases appreciably in amplitude.

If the input to the cavity resonator 3 is frequency modulated, an alternating voltage is obtained from the crystal rectifier 18 having a phase relationship relative to the frequency-modulated input which is dependent on the direction of deviation of the center frequency of the frequency-modulated input from the resonant frequency of the cavity resonator. For example, let it be assumed that the voltage across the capacitor 17 is adjusted to produce a frequency output from the oscillation generator 1 which is lower than the resonant frequency $f_0$ of the resonator, and represented by the dotted line $f_1$ in Fig. 2. Let it be assumed further that the alternating voltage across the resistor 19 in Fig. 1 produces a frequency modulation of the output of the oscillation generator 1 which is represented by the curve C in Fig. 2. For this curve C, abscissae represent frequencies and ordinates represent time.

If the frequency-modulated output of the oscillation generator 1 represented by the curve C is passed through the cavity resonator 3 of Fig. 1, the voltage across the resistor 25 may be represented by the curve D of Fig. 2. For this curve, abscissae represent time and ordinates represent voltage amplitude.

Let it be assumed next that the voltage across the capacitor 17 is adjusted to produce a frequency output $f_2$ from the oscillation generator 1 which is above the resonant frequency $f_0$ of the cavity resonator 3. The frequency-modulated output of the oscillation generator 1 then may be represented by the curve C2 of Fig. 2. The curve C2 is plotted on the same coordinates employed for the curve C.

When the output of the oscillation generator represented by the curve C2 is passed through the cavity resonator 3, the voltage across the resistor 25 is similar to that represented by the curve D2 in Fig. 2. The coordinates for the curve D2 are similar to those employed for the curve D.

The principal distinction between the curves D and D2 is that they are in phase opposition with respect to each other. This opposed phase relationship is obtained for all cases wherein the center frequencies $f_1$ and $f_2$ of the curves C and C2 are on opposite sides of the resonant frequency $f_0$.

As the variation in frequency of the curve C or C2 approaches zero, the rectified output of the cavity resonator 3 approaches a value which may be represented by the slope of the curve B. Consequently, for small variations in frequency of the curve C or C2, the rectified output of the cavity resonator 3 may be represented by a curve E in Fig. 2. For this curve E abscissae represent frequency and ordinates represent the slope of the curve B or the derivative of the function represented by the curve B with respect to frequency. The change in sign of the curve E as it passes through the resonant frequency represents the change in phase relationship between the curves D and D2. It will be noted that the rate of change of the curve E is greatest as it passes through the resonant frequency $f_0$. Consequently, a control circuit may be made extremely sensitive to changes in the curve E for frequency changes adjacent the frequency $f_0$.

The rate of change of the curve E as it passes through the resonant frequency may be varied by varying the frequency modulation of the oscillation generator. As the deviation of the oscillation generator 1 produced by frequency modulation increases, the slope of the curve E as it passes through the resonant frequency decreases, a substantial slope usually is desirable.

Figure 3:
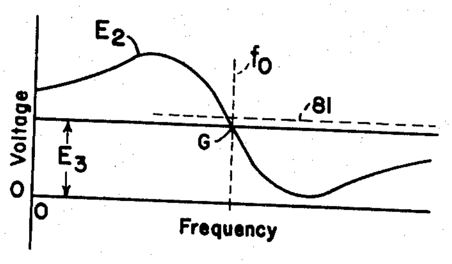
Fig. 3 is a graphical representation illustrating the performance of a phase discriminator and a control circuit employed in a system embodying the invention.

Although a control circuit could be designed which responds to the change in sign as the curve E passes through the frequency $f_0$, it is convenient to raise the entire curve E entirely above the zero voltage line as shown in Fig. 3. In Fig. 3, a curve E2 is shown which corresponds to the curve E of Fig. 2 except that the curve E2 is represented entirely above the zero voltage axis by a distance represented by the voltage E3. It is the purpose of the phase discriminator 5 and the amplifier 7 of Fig. 1 to convert the voltage drop across the resistor 25 which is represented by the curve E in Fig. 2 to a quantity corresponding to that represented by the curve E2 in Fig. 3. To this end, the voltage drop across the resistor 25 is algebraically added to a constant alternating voltage in the phase discriminator.

Referring to Fig. 1, the phase discriminator 5 includes a tetrode 27 having a plate electrode 27*a*, a screen-grid electrode 27*b*, a control-grid electrode 27*c* and a cathode electrode 27*d*. The plate electrode 27*a* is connected through a plate resistor 29 and conductors 31 and 33 to the positive terminal 15*a* on the power supply source 15.

This source 15 may be of any suitable construction, but as illustrated it comprises a voltage divider 15*b* having a central terminal 15*c* which is grounded. The outer terminals 15*a* and 15*d* of the voltage divider are connected respectively to the positive and negative terminals of a battery 16. Consequently, voltages derived from the voltage divider between the terminals 15*a* and 15*c* will be positive with respect to ground. Voltages derived between the terminals 15*c* and 15*d* of the voltage divider will be negative with respect to ground.

Returning to the tetrode 27, the screen-grid electrode 27*b* is connected to a centrally-disposed tap on the voltage divider formed by resistors 35 and 37 which are connected in series between the conductor 31 and ground. The cathode 27*d* is connected to ground through a cathode resistor 39.

The voltage drop across the resistor 25 is coupled to the tetrode 27 through a coupling capacitor 41 and a grid resistor 43. Consequently, the input from the resistor 25 appears across the grid resistor 43 between the cathode and the control-grid electrode 27*c* of the tetrode 27.

An additional voltage is introduced into the circuit connecting the control-grid and cathode electrodes of the tube 27 by connecting the cathode resistor 39 through suitable resistors 45 and 47 across the terminals of the alternating-current generator 13. The frequency of the output of the alternating-current generator 13 may have various suitable values. If the system of Fig. 1 is to be employed in aircraft, the alternating-current generator 13 may be designed to produce a frequency of 800 cycles per second, and may be employed for supplying energy to other equipment on the aircraft. It will be recalled that the alternating-current generator 13 also is employed for frequency modulating the oscillation generator 1.

The parameters of the system are so selected that the voltage drop across the resistor 39 as a result of current supplied by the alternating-current generator 13 is in phase with the voltage drop across the grid resistor 43 when the center frequency of the oscillation generator 1 is below the resonant frequency of the cavity resonator 3. It follows that when the center frequency of the oscillation generator 1 is above the resonant frequency of the cavity resonator 3, the voltage drops across the resistors 39 and 43 are in phase opposition. Consequently, the rectified output of the cavity resonator 3 and the alternating voltage of constant amplitude supplied by the alternating-current generator 13 are algebraically added in the input circuit of the tetrode 27. This corresponds to adding algebraically the voltages represented by the curve E of Fig. 2 to the alternating voltage of constant amplitude represented by the value E3 in Fig. 3 in order to produce the resultant represented by the curve E2 in Fig. 3.

It should be noted from Fig. 3 that values of E2 to the right of the resonant frequency $f_0$ are always lower in amplitude than the voltage E3. Values of the curve E2 for frequencies lower than the resonant frequency $f_0$ are always higher than the voltage E3. Consequently, the point G of intersection of the curve E2 with the voltage E3 is determined accurately by the resonant frequency of the cavity resonator 3.

The tetrode 27 inverts and amplifies a voltage corresponding to that represented by the curve E2 of Fig. 3. The output of the phase discriminator 5 is coupled through a coupling capacitor 49 to a tetrode 51 which serves to invert and further amplify the output of the phase discriminator. The tetrode 51 includes a plate electrode 51*a*, a screen-grid electrode 51*b*, a control-grid electrode 51*c* and a cathode electrode 51*d*. The plate electrode 51*a* is connected through a plate resistor 53 and the conductor 33 to the terminal 15*a* of the power supply source. The screen-grid electrode 51*b* is connected to a centrally disposed tap on a voltage divider formed by resistors 55 and 57. These resistors are connected in series between the conductor 33 and ground. The control-grid electrode 51*c* is connected to ground through a grid resistor 59 and is connected to the coupling capacitor 49. A cathode resistor 61 connects the cathode electrode 51*d* to ground.

Assuming that the values of ordinates are properly selected, the output of the amplifier 7 is represented by the curve E2 in Fig. 3. This output is coupled to the control circuit 9 through a coupling capacitor 62.

The control circuit 9 essentially is a relaxation oscillator employing a gaseous discharge tetrode 63 which conveniently may be of the type commonly referred to as a thyratron. The tetrode 63 has a plate electrode 63*a*, a shield-grid electrode 63*b*, a control-grid electrode 63*c* and a cathode electrode 63*d*. The plate electrode 63*a* is connected through a conductor 65 and a resistor 67 to a terminal 15*e* on the voltage divider which is positive with respect to ground. The shield grid electrode 63*b* and the cathode electrode 63*d* are connected to a terminal 15*f* on the voltage divider which is negative with respect to ground. A capacitor 69 and a current limiting resistor 71 are connected in series between the plate electrode 63*a* and the cathode electrode 63*d*.

In order to bias the control grid electrode 63*c* negatively with respect to the cathode electrode 63*d*, the control-grid electrode is connected through a resistor 73 to an adjustable tap 75 on a potentiometer 77. The potentiometer is connected between the points 15*d* and 15*f* on the voltage divider. The control-grid electrode 63*c* also is connected to the coupling capacitor 62. It will be noted that the terminal A is connected to the plate electrode 63*a* through a resistor 79.

The bias on the control grid electrode 63*c* is adjusted by manipulation of the tap 75 to a value such that a discharge of the tetrode 63 will be initiated when the voltage represented by the curve E2 in Fig. 3 has a value above that represented by the dotted line 81. This value is such that when the frequency of the oscillation generator 1 decreases from a value above the resonant frequency $f_0$ of the cavity resonator 3, a discharge will be initiated in the tetrode 63 immediately after the frequency of the oscillation generator 1 passes through the resonant frequency of the cavity resonator 3.

When this occurs, the capacitor 69 which has previously been charged from the power supply sourve 15 discharges through the tetrode 63. Furthermore, the terminal A is connected through the resistor 79 and the plate-cathode discharge path of the tetrode 63 to the terminal 15*f* of the power supply source. Since the terminal 15*f* represents a substantial negative voltage relative to ground and since the drop through the tetrode 63 is small, this connection of the terminal A tends to restore the charge on the capacitor 17. The recharging of the capacitor 17 continues until the tetrode 63 stops conducting and the capacitor 69 has been recharged to a value such that the plate electrode 63*a* is less negative with respect to ground than the terminal A. The capacitor 17 then resumes its discharge through the circuits across its terminals. This entire cycle is repeated at a frequency which may be of the order of 200 times per second and may be adjusted to maintain the charge on the capacitor 17 within a very small range. It will be recalled that the charge on the capacitor 17 in turn, determines the center frequency of the output of the oscillation generator 1.

As previously pointed out, the search circuit 11 is essentially a relaxation oscillator. It employs a gaseous discharge tetrode 83 which may be similar to the tetrode 63. The tetrode 83 includes a plate electrode 83*a*, a shield-grid electrode 83*b*, a control-grid electrode 83*c* and a cathode electrode 83*d*. The plate electrode 83*a* is connected to the terminal 15*f* of the voltage divider 15*b* through a circuit which includes, in series, a conductor 85, resistors 87, 89 and 91, and a conductor 93. The resistor 91 is shunted by a fixed resistor 95 and an adjustable resistor 97. The plate electrode 83*a* also is connected to the terminal A through a resistor 99. The cathode 83*d* and the shield-grid electrode 83*b* are connected to ground through a cathode resistor 101 which is shunted by a capacitor 103. A resistor 105 also connects the cathode to the junction between the resistors 95 and 97.

In order to understand the operation of the search circuit, it should be noted that the cathode electrode 83*d* is maintained at a substantial negative voltage with respect to ground which is determined by the drop across the cathode resistor 101. This resistor is connected to the terminal 15*f* of the voltage divider through the resistor 105 and the parallel combination of resistors 91, 95 and 97.

The terminal A is centrally disposed on a loop circuit which may be traced from the terminal 15e of the voltage divider 15b through the resistors 67 and 79, the terminal A, resistors 99, 87 and 89 and the parallel combination of resistors 91, 95 and 97 to terminal 15f on the voltage divider. The parameters of this loop circuit may be so selected that the terminal A and the adjacent plate electrode 83a, when the system is initially energized, are substantially more positive than the cathode electrode 83d with respect to ground. Under these conditions, a discharge is initiated in the tetrode 83a. Since the voltage drop between the plate and cathode electrodes of the tetrode 83 is small, the terminal A is brought close to the voltage of the cathode electrode 83d with respect to ground and the capacitor 17 receives a charge which tends to maintain the terminal A negative with respect to ground.

After the capacitor has been charged, the discharge in the tetrode 83 ceases and the capacitor 17 then begins to discharge through the circuits connecting its terminals. The rate of discharge of the capacitor 17 is controlled by the time constant of the capacitor and its associated discharge circuits. If the discharge continues for such a time that the plate electrode 83a of the tetrode 83 becomes substantially positive with respect to the cathode electrode 83d for the grid connections employed, the tetrode 83 again discharges and restores the charge of the capacitor 17. However, if the charge on the capacitor 17 is maintained within close limits by the operation of the control circuit 9, no further operation of the tetrode 83 occurs.

By inspection of the search circuit, it will be observed that the control-grid electrode 83c is connected to a tap on a voltage divider which, in turn, is connected between the plate and cathode electrodes of the tetrode 83. This voltage divider is formed by the resistors 87, 89, the parallel combination of resistors 91, 95 and 97 and the resistor 105. Consequently, as the plate electrode 83a becomes more positive with respect to the cathode electrode 83d, the control-grid electrode 83c also becomes more positive with respect to the cathode electrode. The advantages of such a connection of the control-grid electrode may be understood by reference to Fig. 5.

Figure 5:
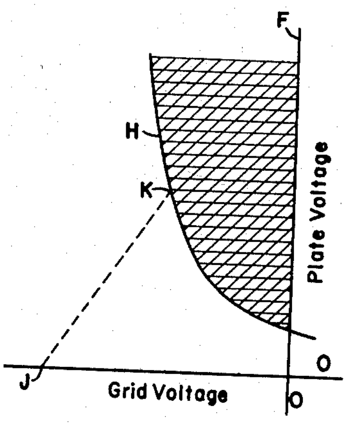
Fig. 5 is a graphical representation of the firing characteristic of a gaseous discharge tube.

In Fig. 5 ordinates represent plate-to-cathode voltage and abscissae represent grid-to-cathode voltage of a tube. The curve H represents the firing characteristics of a gaseous-discharge tube suitable for the tetrode 83. Such a tube fires when the plate and grid voltages are such as to fall within the shaded area of Fig. 5.

Let it be assumed that the tube normally has a negative bias represented by the grid voltage J. As the plate voltage becomes more positive with respect to the cathode electrode, the control-grid voltage also becomes more positive. Consequently, as the plate voltage becomes more positive, the relationship between grid and plate voltages relative to the cathode follow a curve similar to that depicted by the curve JK. When these voltages reach the curve H, the tube fires.

If the grid voltage were held constant as the plate voltage increased, the line JK would appear in Fig. 5 as a vertical line. Such a line would intercept the curve H at a very small angle and slight variations in grid or plate voltages would result in a substantial variation in the firing point of the tube. By forcing the grid voltage to become more positive as the plate voltage becomes more positive, the line JK intercepts the curve H at a substantial angle and the point at which the tube fires consequently does not vary appreciably for small variations in grid or plate voltages.

The operation of the system as a whole now will be considered. When the system is initially energized, the cathode electrode 83d of the tetrode 83 is at a substantial negative voltage relative to the plate electrode 83a. Consequently, a discharge is initiated in the tetrode 83. This effectively connects the terminal A to the cathode elecrode 83d through the resistor 99, which has a relatively low value, and through the low-resistance path between the plate and cathode electrodes of the tetrode. For this reason, the terminal A is lowered to a substantial negative voltage relative to ground and the capacitor 17 charges in such a direction as to tend to maintain the terminal A at this voltage.

After the capacitor 17 has been charged, the discharge in the tetrode 83 terminates and the capacitor 17 begins to discharge through a first path including the resistors 79 and 67 and a second path including the resistors 99, 87, 89 and associated resistors. Since the resistance of the first path is relatively smaller in value, the rate of discharge of the capacitor 17 may be controlled effectively by suitable selection of the value of the resistor 79.

Figure 4:
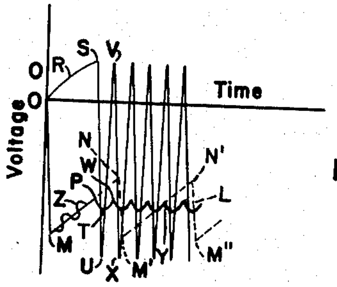
Fig. 4 is a graphical representation illustrating the performance of a system illustrated in Fig. 1.

If the capacitor 17 discharges sufficiently to bring the voltage of the plate electrode 83a to a substantial positive value relative to that of the cathode electrode 83d, a second discharge is initiated in the tetrode 83. This cycle is repeated to produce a saw-tooth characteristic represented in Fig. 4 by the dotted curve L. In Fig. 4 abscissae represent time and ordinates represent voltage. This curve represents the voltage of the terminal A relative to ground produced by operation of the search circuit 11.

It will be noted that when the system is first energized, the tetrode 83 of Fig. 1 rapidly lowers the voltage of the terminal A to a substantial negative value relative to ground which is represented in Fig. 4 by the reference character M. As the capacitor 17 discharges, the voltage of the terminal A rises towards a value N. If the voltage reaches the value N, the conditions are proper for initiating a second discharge in the tetrode 83 which again lowers the voltage of the terminal A to the value M'.

The voltage M is applied to the reflector electrode of the oscillation generator 1 (Fig. 1) and has a negative value relative to ground of sufficient magnitude to produce a frequency output from the oscillation generator 1 which is above the resonant frequency $f_0$ of the cavity resonator 3. In addition, the reflector electrode 1b of the oscillation generator has an alternating voltage applied thereto which corresponds to the voltage drop across the resistor 19. However, since the output frequency of the oscillation generator is above the resonant frequency of the cavity resonator 3, the voltage output from the crystal rectifier 18 establishes a voltage across the grid resistor 43 which is in phase opposition to the voltage drop across the resistor 39. It will be recalled that the voltage drop across the resistor 39 is produced by current supplied from the alternating-current generator 13. Since these voltages are in phase opposition, the output of the amplifier 7 is insufficient to initiate a discharge of the control-circuit tetrode 63.

As the voltage of the terminal A becomes less negative along the line MN of Fig. 4, it reaches a value P at which the output frequency of the oscillation generator equals the resonant frequency of the cavity resonator 3. When the output frequency passes through this point, the output of the crystal rectifier 18 reverses in phase and the voltage drops across the resistors 39 and 43 are in phase. The voltage output of the amplifier 7, corresponding to the voltage E2 of Fig. 3, consequently reaches a value above the bias voltage represented by the dotted line 81 in Fig. 3 and initiates a discharge of the control-circuit tetrode 63.

When the system of Fig. 1 is initially energized, a charge is stored in the capacitor 69 which maintains the plate electrode 63*a* positive with respect to its cathode 63*d*. The plate electrode 63*a* is maintained initially at a substantial positive voltage relative to ground which is represented in Fig. 4 by a curve RS.

When the discharge is initiated in the tetrode 63, the capacitor 69 discharges through the tetrode. Furthermore, the plate electrode 63*a* is connected to the cathode electrode 63*d* through a low-resistance path. Since the cathode 63*d* is maintained at a substantial negative voltage relative to ground, the plate electrode 63*a* also is brought to a substantial negative voltage relative to ground. Inasmuch as the terminal A is connected to the plate electrode 63*a*, the discharge of the tetrode 63 tends to restore the charge of the capacitor 17. The charge of the capacitor 17 is represented in Fig. 4 by the curve PT.

By reference to Fig. 4, it will be observed that the voltage of the plate electrode 63*a* relative to ground at a time corresponding to the point P drops rapidly to a substantial negative value relative to ground which is represented by the point U. At the point U, the discharge in the tetrode 63 terminates and the capacitor 69 begins to charge. As the capacitor 69 charges, the voltage of the plate electrode 63*a* relative to ground increases along the curve UV. When this voltage becomes less negative than the terminal A relative to ground, the charging of the capacitor 17 terminates and this capacitor then begins to discharge through the paths connecting its terminals, as represented by the curve TW. The time available for charge of the capacitor 17 along the curve PT may be controlled over an adequate range by suitable selection of the time constant of the capacitor 69 and its associated charge and discharge circuit.

When the voltage of the terminal A relative to ground reaches the value W, the output frequency of the oscillation generator 1 again passes through the resonant frequency of the cavity resonator 3, and through the detector, phase discriminator and amplifier initiates a second discharge of the tetrode 63. The capacitor 69 again discharges through the tetrode 63 and the voltage of the plate electrode 63*a* drops to a low negative value relative to ground, as represented by the curve VX in Fig. 4. This, in turn, restores the charge on the capacitor 17, and the cycle is repeated at any desired rate such as 200 times per second. By operation of the control circuit, it is possible to maintain the voltage across the capacitor 17 within a range of plus or minus 0.05 volt. This, in turn, maintains the output frequency of the oscillation generator 1 within a small range such as a range of one part in 100,000.

It should be noted that as long as the control circuit maintains the charge on the capacitor 17, the terminal A never reaches the voltage represented by the point N in Fig. 4, and the search circuit remains inoperative. However, should the control circuit fail to operate at any point, such as the point Y in Fig. 4, the voltage represented by the curve L would increase to a value N' capable of initiating a discharge in the search-circuit tetrode 83. This would restore the voltage of the terminal A to a value M'' corresponding to the initial value M. The operation of the circuit then would be similar to that explained for the initial energization thereof.

It should be noted that the voltage drop across the resistor 19 introduces at all times a ripple in the voltage of the terminal A relative to ground. This ripple is indicated for part only of Fig. 4 by a curve Z.

The phase discriminator and amplifier of Fig. 1 may employ type 6AK5 tubes in conventional amplifier circuits. The principal distinction introduced in these circuits by the invention is the connection of the cathode resistor 39 across the alternating-current generator 13. Since these circuits otherwise are of substantially conventional construction, it is believed that further description thereof is unnecessary.

However, it may be of help to list typical values for the components of the control and search circuits. These circuits may employ type 2D21 thyratron tubes. The capacitors employed may have the following values:

- 62=10,000 micro-microfarads
- 69=10,000 micro-microfarads
- 17=0.5 microfarad
- 103=1 microfarad The resistors have the following values:

- 73=470,000 ohms
- 77=100,000 ohms
- 71=1600 ohms
- 67=470,000 ohms
- 79=2.2 megohms
- 19=10 ohms
- 99=1600 ohms
- 87=4.7 megohms
- 89=1 megohm
- 91=1 megohm
- 95=75,000 ohms
- 97=100,000 ohms
- 105=8200 ohms
- 101=100,000 ohms For such a circuit the voltage divider 15*b* may be designed to provide positive voltages from the terminal 15*a* and 15*e* which are, respectively, 150 and 105 volts relative to ground. The voltage divider also provides from terminals 15*d* and 15*f* negative voltages which are respectively 325 and 255 volts relative to ground.

It will be noted that several adjustable controls are provided for the system of Fig. 1. The voltage M (Fig. 4) may be adjusted over a suitable range by manipulation of the adjustable tap associated with the resistor 97. This does not affect appreciably the total voltage sweep of the search circuit which is represented by the distance NM' in Fig. 4. This voltage sweep may be of the order of 50 volts when employed in association with an oscillation generator 1 of the Klystron type known as type 723A. As previously explained, the movable tap 75 controls the bias on the tetrode 63 or the value of the voltage represented by the line 81 in Fig. 3. In addition, if the cavity resonator 3 is of the adjustable type, the resonant frequency thereof may be adjusted by manipulation of the adjustment unit 23.

The voltage drop across the resistor 19 produced by the alternating current generator 13 may be of the order of 0.1 to 1 volt.

Various applications of the system illustrated in Fig. 1 may be made. A portion of the output of the oscillation generator 1 may be obtained through a suitable connection 106. This connection may be employed as a source of constant frequency for any desired purpose. For example, the system of Fig. 1 may be employed as a local oscillator in an otherwise conventional superheterodyne receiver. Such a receiver is illustrated in Fig. 6.

Figure 6:
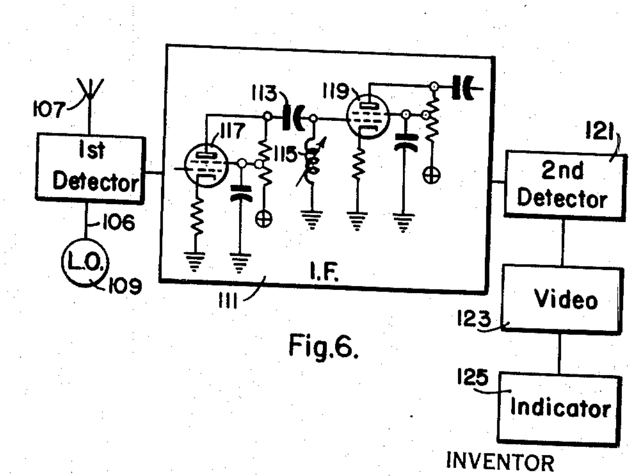
Fig. 6 shows in block form a superheterodyne receiver.

Referring to Fig. 6, an antenna 107 is illustrated for receiving code signals having a carrier frequency which may be of the order of 10,000 megacycles. These signals are supplied to a first detector which also receives energy from a local oscillator 109. The local oscillator may be of the type illustrated in Fig. 1. It will be noted that the connection 106 of Fig. 1 is illustrated in Fig. 6.

In the first detector, the local oscillations are mixed with the signal and the resulting intermediate frequency is supplied to one or more intermediate frequency stages 111. These intermediate frequency stages may be of any conventional structure suitable for operation at a suitable intermediate frequency. For operation with intermediate frequencies of 30 or 60 megacycles, the intermediate frequency stages may have a band pass width of the order of 0.5 to 5 megacycles. In equipment actually constructed a band pass width of 2.6 megacycles was employed. As illustrated in Fig. 6, such a stage may employ a coupling capacitor 113 and an inductor 115 for coupling two tubes 117 and 119. The capacitor 113, together with the inductor 115 and any inductance and capacitance inherent in the connections between the tubes, are tunded to resonate at the intermediate frequency.

The output of the intermediate frequency stages is supplied to a second conventional detector 121. The output of the second conventional detector, in turn, is amplified in a suitable video amplifier 123 and translated in any suitable indicator device 125, such as a cathode-ray-tube indicator device.

Figure 7:
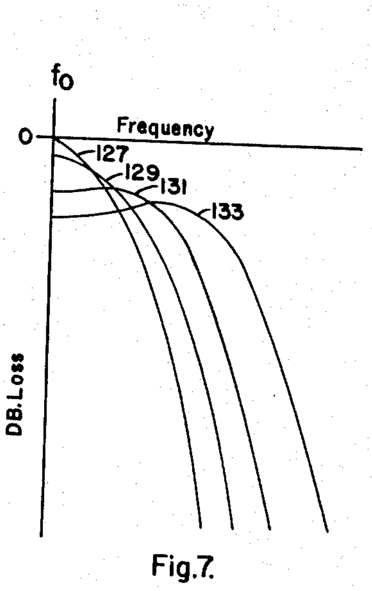
Fig. 7 is a graphical representation showing the pass characteristic of an intermediate frequency stage of a superheterodyne receiver.

Certain benefits are obtained by frequency modulating the output of the local oscillator 109. These may be understood more readily by reference to Fig. 7 which shows a family of curves plotted on coordinates wherein abscissae represent frequency and ordinates represent loss in intermediate frequency stages of a superheterodyne receiver. If a single frequency is passed through the intermediate frequency stages, a curve similar to the curve 127 is obtained. This curve shows substantially no loss at the resonant frequency $f_0$ of the intermediate frequency stages, but loss increases appreciably as the frequency departs from this resonant frequency. Consequently, the curve 127 represents very selective performance of the intermediate stages. The curve 127 applies to frequencies which either increase or decrease from the resonant frequency.

If a small frequency modulation is incorporated in the local oscillations, a curve similar to the curve 129 is obtained. By inspection of Fig. 7, it will be noted that the curve 129 shows increased loss adjacent the resonant frequency of the intermediate frequency stages but it shows decreased losses for frequencies displaced appreciably from the resonant frequency $f_0$. Consequently, the curve 129 shows a wider band pass characteristic. As the frequency modulation increases in magnitude, band pass characteristics similar to those represented by the curves 131 and 133 are obtained. Consequently, it will be noted that by introducing frequency modulation in the local oscillations, it is possible to widen the band pass frequency range of an intermediate frequency amplifier. It will be recalled that frequency modulation of the oscillation generator 1 is produced by the alternating voltage drop across the resistor 19 (Fig. 1).

Figure 8:
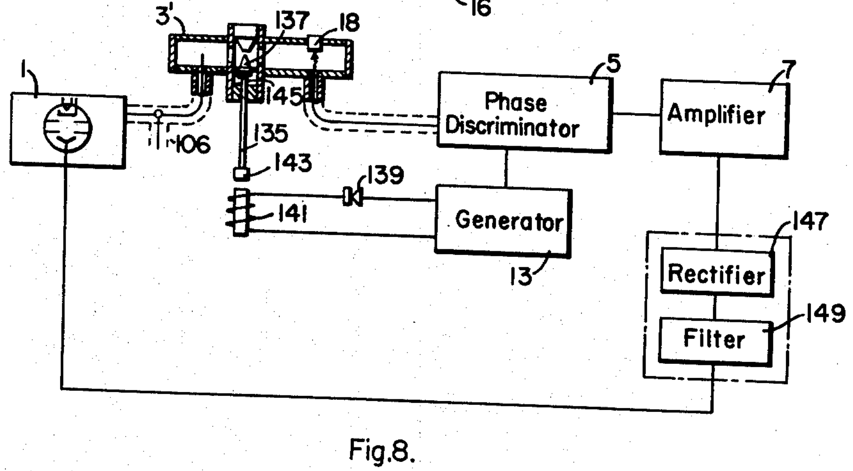
Fig. 8 is a schematic view with parts in cross section showing a modified form of the invention.

Fig. 8 shows a modification of the system illustrated in Fig. 1. In Fig. 8, the oscillation generator 1 is coupled to a cavity resonator 3′ which corresponds to the cavity resonator 3 of Fig. 1. However, the cavity resonator 3′ has a resonant frequency which may be varied by reciprocation of a rod 135. The rod is connected to an electrode 137 mounted in the cavity resonator. The output from the cavity resonator 3′ is obtained from the crystal rectifier 18 and is supplied to the phase discriminator 5 and the amplifier 7 in a manner similar to that illustrated in Fig. 1. It will be noted that the generator 13 again is connected to the phase discriminator 5 in the manner discussed with reference to Fig. 1.

The generator 13 also is employed for actuating the rod 135 in order to vary the resonant frequency of the cavity resonator 3′. To this end, the generator is connected through a half-wave rectifier 139 to a solenoid 141 which is employed, when energized, for attracting the magnetic armature 143. When the solenoid 141 is energized, it moves the rod 135 downwardly, as viewed in Fig. 8, against the resistance of a spring 145. When the solenoid is deenergized, the spring 145 restores the rod 135 and the associated electrode 137 to their initial positions. This continued oscillation of the electrode 137 results in an oscillation of the resonant frequency of the cavity resonator 3′ about an average resonant frequency.

Referring to Fig. 2, it will be noted that variation of the resonant frequency of a cavity resonator has the effect of introducing an alternating component into the output of the crystal rectifier 19. For example, if the frequency $f_1$ of Fig. 2 is applied to a cavity resonator and the resonant frequency of the cavity is oscillated within predetermined limits, a voltage similar to that represented by the curve D will be obtained from the crystal rectifier 18. On the other hand, if a frequency $f_2$ is supplied to the cavity resonator, a curve similar to curve D2 will be obtained from the crystal rectifier. Consequently, the output from the amplifier 7 of Fig. 8 will correspond to the curve E2 of Fig. 3. This output may be rectified by a rectifier 147 and filtered by a filiter 149 to produce a direct voltage which is substantially free from ripple. The direct voltage is applied between the reflector electrode and cathode electrode of the oscillation generator 1 of Fig. 8.

Let it be assumed that the oscillation generator 1 of Fig. 8 requires a voltage between its reflector and cathode electrodes similar to that represented by the voltage E3 of Fig. 3 in order to produce normally the desired frequency $f_0$. This voltage normally is produced by the amplifier 7 of Fig. 8 and is rectified and filtered by the rectifier 147 and filter 149 prior to application to the oscillation generator 1.

If for any reason, the frequency of the oscillation generator 1 increases above the value $f_0$, the output of the amplifier 7 would drop as clearly shown by reference to the curve E2 of Fig. 3. The decrease in voltage output of the amplifier 7 would result in a decrease in magnitude of the voltage applied between the reflector and cathode electrodes of the oscillation generator 1.

On the other hand, if the frequency of the oscillation generator 1 should tend to decrease below the frequency $f_0$, the output of the amplifier 7 would tend to increase as clearly shown by reference to curve E2 of Fig. 3. This voltage output of the amplifier is rectified, filtered and applied to the oscillation generator 1, and tends to increase the frequency produced by the oscillation generator. It will be understood that the voltage represented by the curve E2 of Fig. 3 is rectified, filtered and applied to the oscillation generator in such polarity as to make the reflector electrode negative relative to the associated cathode electrode. From a consideration of this discussion, it will be observed that the system of Fig. 8 tends to maintain a constant frequency from the oscillation generator without recourse to the control and search circuits of Fig. 1.

Although the invention has been described with reference to certain specific embodiments thereof, numerous modifications are possible. Therefore, the invention is to be defined only by the appended claims as interpreted in view of the prior art.

I claim as my invention:

1. A frequency controlling system comprising an oscillator, a low loss resonant tank circuit fed with waves derived from said oscillator, said tank circuit being tuned to a desired frequency of operation of said oscillator, means for frequency modulating said oscillator with frequency controlling waves, an amplitude modulation detector for detecting wave energy appearing in said tank circuit, a phase detector supplied with waves from said first mentioned detector and with waves having a frequency corresponding to said control frequency, and instrumentalities responsive to the output of said phase detector for adjusting the mean frequency of operation of said oscillator.

2. A frequency controlling system comprising an oscillator, a low loss sharply resonant tank circuit, resonant at the desired frequency of operation of the oscillator, fed with waves derived from said oscillator, said tank circuit being tuned to a desired frequency of operation, means for frequency modulating said oscillator with frequency controlling waves, the frequency swing being such as to vary the frequency of the oscillator from one side of the characteristic curve of said resonant circuit to the other, an amplitude modulation detector for detecting wave energy appearing in said tank circuit, a phase detector supplied with waves from said first mentioned detector and with waves having a frequency corresponding to said control frequency, and instrumentalities responsive to the output of said phase detector for adjusting the mean frequency of operation of said oscillator.

3. A frequency controlling system comprising, in combination, an ultra-high-frequency oscillator, a resonant cavity having input and output terminals, said cavity being tuned to a predetermined desired frequency of operation of said oscillator, means for supplying oscillations from said oscillator to said input terminals, means for frequency-modulating said oscillations in response to relatively low frequency control waves, the amplitude of said control waves being sufficient to vary the frequency of said oscillations over a range extending on either side of said desired frequency, means for detecting relatively low frequency amplitude modulation waves thereby produced in the envelope of said oscillations at said output terminals, means for combining said control frequency waves and modulation waves algebraically to produce a resultant wave, and means for adjusting the mean frequency of said oscillator in response to an amplitude characteristic of said resultant wave.

4. The combination specified in claim 1 in which said oscillator is given a center frequency which is varied from a value displaced from the resonant frequency of the resonant circuit through the resonant frequency of said resonant circuit.

5. The combination specified in claim 4 in which said instrumentalities reverse the direction of variation of said center frequency substantially in response to the passage of said center frequency through said resonant frequency.

6. The combination specified in claim 1 in which said frequency modulation comprises periodic variation about a center frequency at a control frequency, and variation of said center frequency from a value displaced from said desired frequency through said desired frequency, and in which said instrumentalities include a switching tube having an input electrode on which a voltage of said control frequency is impressed and an output circuit which is made conductive by said voltage to reverse the direction of variation of said center frequency.

References Cited in the file of this patent

UNITED STATES PATENTS

| Number | Name | Date |
|---|---|---|
| 2,104,801 | Hansell | Jan. 11, 1938 |
| 2,173,130 | Peterson | Sept. 19, 1939 |
| 2,245,685 | Koch | June 17, 1941 |
| 2,250,102 | Klemperer | July 22, 1941 |
| 2,287,925 | White | June 30, 1942 |
| 2,404,568 | Dow | July 23, 1946 |
| 2,428,265 | Crosby | Sept. 30, 1947 |
| 2,434,293 | Stearns | Jan. 13, 1948 |
| 2,462,857 | Ginzton et al. | Mar. 1, 1949 |
| 2,475,074 | Bradley | July 5, 1949 |